(12) United States Patent
Kawamura et al.

(10) Patent No.: US 7,271,938 B2
(45) Date of Patent: Sep. 18, 2007

(54) METHOD AND APPARATUS FOR OPTICAL SCANNING CAPABLE OF EFFICIENTLY REDUCING AN IMAGE SURFACE DISTORTION

(75) Inventors: Atsushi Kawamura, Kanagawa-ken (JP); Magane Aoki, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 976 days.

(21) Appl. No.: 10/345,365

(22) Filed: Jan. 16, 2003

(65) Prior Publication Data
US 2003/0161046 A1 Aug. 28, 2003

(30) Foreign Application Priority Data
Jan. 16, 2002 (JP) ............................. 2002-007204

(51) Int. Cl.
*H04N 1/46* (2006.01)
(52) U.S. Cl. ..................... 358/509; 358/480; 358/500; 358/505; 358/471; 358/474; 358/400; 362/3; 359/196; 359/237
(58) Field of Classification Search ................ 358/480, 358/509, 500, 505, 474, 400; 359/618–619, 359/649, 202, 196, 237; 345/204; 362/3
See application file for complete search history.

(56) References Cited

U.S. PATENT DOCUMENTS

| | | | |
|---|---|---|---|
| 6,166,842 A | 12/2000 | Aoki et al. | |
| 6,185,026 B1 | 2/2001 | Hayashi et al. | |
| 6,198,562 B1 | 3/2001 | Hayashi et al. | |
| 6,256,133 B1 | 7/2001 | Suzuki et al. | |
| 6,266,174 B1 | 7/2001 | Aoki | |
| 6,288,819 B1 | 9/2001 | Aoki et al. | |
| 6,317,246 B1 | 11/2001 | Hayashi et al. | |
| 6,347,004 B1 | 2/2002 | Suzuki et al. | |
| 6,348,988 B2 | 2/2002 | Aoki et al. | |
| 6,348,989 B2 | 2/2002 | Aoki et al. | |
| 6,359,717 B2 | 3/2002 | Suzuki et al. | |

(Continued)

FOREIGN PATENT DOCUMENTS

JP 2001-201710 7/2001

OTHER PUBLICATIONS

U.S. Appl. No. 10/345,365, filed Jan. 16, 2003, Kawamura et al.

(Continued)

*Primary Examiner*—Aung S. Moe
*Assistant Examiner*—Heather D Gibbs
(74) *Attorney, Agent, or Firm*—Oblon, Spivak, McClelland, Maier & Neustadt, P.C.

(57) ABSTRACT

An optical scanning apparatus includes mechanisms for light modulation, light imaging, light deflecting, and light scanning. The light modulation mechanism includes at least one light modulation device including light modulation elements, and is configured to emit modulated light. The light modulation elements are arranged in a single-dimension formation in a first direction orthogonal to a light axis of the modulated light. The light imaging mechanism transfers the modulated light as light of an object to form an image of the object on an image screen. The light deflecting mechanism deflects the light of the object in a direction orthogonal to the first direction and the axis of the light. The light scanning mechanism is disposed on a passage of the deflected light to scan that light.

48 Claims, 4 Drawing Sheets

U.S. PATENT DOCUMENTS

| | | |
|---|---|---|
| 6,366,384 B1 | 4/2002 | Aoki et al. |
| 6,376,837 B1 | 4/2002 | Itabashi et al. |
| 6,388,792 B1 | 5/2002 | Atsuumi et al. |
| 6,400,391 B1 | 6/2002 | Suhara et al. |
| 6,448,998 B1 | 9/2002 | Suzuki et al. |
| 6,496,293 B2 | 12/2002 | Kawamura |
| 6,509,995 B1 | 1/2003 | Suzuki et al. |
| 2001/0022673 A1* | 9/2001 | Sato et al. .................. 358/480 |
| 2002/0080428 A1 | 6/2002 | Suzuki et al. |
| 2002/0159122 A1 | 10/2002 | Aoki et al. |

OTHER PUBLICATIONS

U.S. Appl. No. 10/635,520, filed Aug. 7, 2003, Sakai et al.
U.S. Appl. No. 10/345,365, filed Jan. 16, 2003, Kawamura et al.
U.S. Appl. No. 10/659,342, filed Sep. 11, 2003, Kawamura.
U.S. Appl. No. 10/345,365, filed Jan. 16, 2003, Kawamura et al.
U.S. Appl. No. 10/820,733, filed Apr. 9, 2004, Suhara et al.
U.S. Appl. No. 09/985,753, filed Nov. 6, 2001, Kawamura.
U.S. Appl. No. 10/143,013, filed May 13, 2002, Suhara et al.
U.S. Appl. No. 10/210,056, filed Aug. 2, 2002, Atsuumi et al.
U.S. Appl. No. 10/345,365, filed Jan. 16, 2003, Kawamura et al.
U.S. Appl. No. 09/955,181, filed Sep. 19, 2001, Suzuki et al.
U.S. Appl. No. 09/969,982, filed Oct. 3, 2001, Aoki et al.
U.S. Appl. No. 09/678,611, filed Oct. 4, 2000, Sakai et al.

* cited by examiner

METHOD AND APPARATUS FOR OPTICAL SCANNING CAPABLE OF EFFICIENTLY REDUCING AN IMAGE SURFACE DISTORTION

BACKGROUND OF THE INVENTION

1. Field of the Invention

The present invention relates to a method and apparatus for optical scanning, and more particularly to a method and apparatus for optical scanning capable of efficiently reducing an image surface distortion.

2. Discussion of the Background

A display apparatus for displaying an image by performing a line-by-line light scanning is well known, using a light deflecting mechanism such as a polygon mirror for deflecting light such as a laser beam generated by a point light source. For example, there are two types of known beam scanning optical systems; a post-objective type and a pre-objective type. FIG. 1A shows the post-objective type beam scanning optical system and FIG. 1B shows the pre-objective type beam scanning optical system. In the both systems, a deflective reflection surface of a light deflecting device 71 is arranged at a position orthogonal to the surface of the drawing and is rotatable or movable in a plane parallel to the surface of the drawing so that a scanning line can be drawn in a direction parallel to the surface of the drawing on an image surface 72.

In the post-objective type beam scanning optical system shown in FIG. 1A, the light deflecting device 71 is arranged behind a light imaging system 70. On the other hand, the light deflecting device 71 is disposed before the light imaging system 70 in the pre-objective type beam scanning optical system.

As shown in the post-objective type beam scanning optical system of FIG. 1A, an image surface distortion is caused and a linearity, that is, a constant velocity characteristic is not sufficiently corrected. However, in the post-objective type beam scanning optical system, the light imaging system 70 is required to converge one beam and can be made in a relatively small size. Therefore, in the case where the image surface 72 is allowed to have a relatively large beam spot diameter, the post-objective beam scanning optical system is used, in defiance of the image surface distortion.

On the other hand, the pre-objective beam scanning optical system of FIG. 1B has various advantages in which the image surface distortion can be reduced and the image surface can be flattened. In addition, this system achieves the linearity since the light imaging system 70 can correct the scanning speed which is apt to increase in peripheral regions of the image height. However, the light imaging system 70 including lenses is disposed in the light rays which are separated for the light scanning and is consequently made in a relatively large size.

Recently, Silicon Light Machines, California, U.S.A., introduced a grating light valve which arranges pixels in a single dimension as a single-dimension light modulation device. After that, a projecting apparatus is developed, in which the above-mentioned grating light valve is used as an object and an image of the object is scanned and deflected in a direction orthogonal to the pixel arrangement direction to obtain a projection image. This projecting apparatus has an optical arrangement of the post-objective type and has a drawback that the image surface distortion cannot be corrected, as in the case of the laser beam scanning. Further, although the post-objective type optical arrangement has the advantage that the light imaging system can be made relatively small, the apparatus becomes large and wide in the pixel arrangement direction.

Japanese Laid-Open Patent Application Publication, No. 2001-201710, describes an exemplary optical arrangement of a pre-objective type beam scanning optical system and a projecting apparatus using the above-mentioned grating light valve. These apparatuses are provided with the grating light valve, a lighting system for irradiating the grating light valve with light, and a light scanning system for scanning with the light from the grating light valve. The light scanning system includes a galvano mirror. This galvano mirror has a light translucent region and is configured to select a light ray propagating in a predetermined direction from among a plurality of light rays transmitted from the grating light valve and to deflect the light ray in a plurality of directions in a sequential manner.

The above-mentioned apparatuses described by Japanese Laid-Open Patent Application Publication, No. 2001-201710, have many constraints on the specifications required to the light imaging and scanning systems, and also have drawbacks in which a number of lenses are relatively large and each lens is required to be relatively large.

The projecting apparatus with a digital micro-mirror device, which is an area-type light modulation device, has been marketed. However, the area-type light modulation device has many constraints, so that the manufacturing cost cannot easily be carried out. As a consequence, there is a certain limit in downsizing the optical system and the whole system.

Further, a display apparatus has been developed in which three color laser beams are independently modulated and used for two-dimensional scanning. This apparatus needs a high power light source for the three colors, and therefore has a relatively large size. In addition, in this apparatus, the pixel frequency is extremely high, which is not easy to handle.

SUMMARY OF THE INVENTION

In view of the foregoing, it is an object of the present invention to provide a novel optical scanning apparatus that efficiently reduces an image surface distortion to output a superior quality image.

Another object of the present invention is to provide a novel optical scanning method that efficiently reduces an image surface distortion to output a superior quality image.

To achieve the these and other objects, in one example, a novel optical scanning apparatus includes a light modulation mechanism, a light imaging mechanism, a light deflecting mechanism, and a light scanning mechanism. The light modulation mechanism includes at least one light modulation device including a plurality of light modulation elements, and is configured to emit modulated light. The plurality of light modulation elements are arranged in a single-dimension formation in a first direction orthogonal to a light axis of the modulated light. The light imaging mechanism is configured to receive the modulated light from the light modulation mechanism as light of an object, and to transfer the light of the object to form an image of the object in a single-dimension formation on an image screen. The light deflecting mechanism is configured to deflect the light of the object transferred from the light imaging mechanism in a direction orthogonal to the first direction and to the axis of the light. The light scanning mechanism is disposed on a passage of the light deflected by the light deflecting mechanism, and is configured to scan the light deflected by the light deflecting mechanism.

The plurality of light modulation elements may be non-self-light-emitting light modulation elements, and the light modulation mechanism may further include a lighting mechanism for lighting the at least one light modulation device and for selectively transferring light corresponding to a selected signal among the light from the lighting mechanism.

Each of the plurality of non-self-light-emitting light modulation elements may be a both-end-fixed beam light valve including a light reflection film, and be configured to reflect the light from the lighting mechanism such that light reflected in a regular manner corresponds to the selected signal.

Each of the plurality of light modulation elements may be self-light-emitting light modulation elements.

The light imaging mechanism may satisfy a relationship $Hv \propto fv*\tan(\theta v)$, wherein Hv is an image height of the light imaging mechanism in the first direction, fv is a focal length of the light imaging mechanism in the first direction, and $\theta v$ is an incident angle of light entering the light imaging mechanism.

The modulated light from each of the plurality of light modulation elements may have a directivity center directed to an incident pupil of the light imaging mechanism.

The light imaging mechanism may include a telecentric optical element arranged at a position facing the object.

The light imaging mechanism may have an aperture-behind structure.

The light scanning mechanism includes means for reducing an image surface distortion caused by the light deflecting mechanism.

The light scanning mechanism may satisfy a relationship $Hh \propto \theta h$, wherein Hh is an image height of the light scanning mechanism in a direction orthogonal to the first direction, and $\theta h$ is an incident angle of the light entering the light scanning mechanism after the deflection by the light deflecting mechanism.

A distance between the light modulation mechanism and the light imaging mechanism along the light axis may be adjusted to focus the modulated light to form an image of the object.

Further, to achieve the above-mentioned objects, in one example, another novel optical scanning apparatus includes an image screen and an optical scanning apparatus. The optical scanning apparatus includes a light modulation mechanism, a light imaging mechanism, a light deflecting mechanism, and a light scanning mechanism. The light modulation mechanism includes at least one light modulation device including a plurality of light modulation elements and is configured to emit modulate light. The plurality of light modulation elements are arranged in a single-dimension formation in a first direction orthogonal to a light axis of the modulated light. The light imaging mechanism is configured to receive the modulated light from the light modulation mechanism as light of an object and to transfer the light of the object to form an image of the object in a single-dimension formation on an image screen. The light deflecting mechanism is configured to deflect the light of the object transferred from the light imaging mechanism in a direction orthogonal to the first direction and to the light axis. The light scanning mechanism is disposed on a passage of the light deflected by the light deflecting mechanism and configured to scan the light deflected by the light deflecting mechanism. In this structure, an image of the object formed in the single dimension in a manner corresponding to a specific deflection angle displays a line image in a vertical direction on the image screen. By swinging the light from the light imaging mechanism with the light deflecting mechanism by a predetermined angle in a second direction orthogonal to the first direction, the line image formed in the vertical direction on the image screen is moved in the second direction so that a full screen image is displayed on the image screen.

Each of the plurality of light modulation elements may be switched between on and off statuses, and each has a time period of on status that is shorter than a time period of displaying one pixel, to express an intermediate light intensity.

The above-mentioned at least one light modulation device may include three light modulation devices corresponding to red, green, and blue colors arranged in a direction orthogonal to the first direction.

A color synthesizing may be performed by overlaying the red, green, and blue colors at different times at a same pixel position in a scanning direction.

Further, to achieve the above-mentioned objects, in one example, a novel display apparatus includes the steps of providing, driving, transferring, deflecting, and scanning. The providing step provides a light modulation mechanism including at least one light modulation device including a plurality of light modulation elements arranged in a single-dimension formation in the first direction. The driving step drives the light modulation mechanism to emit modulated light extended in a single-dimension formation in a first direction orthogonal to an axis of the light. The transferring step transfers the modulated light as light of an object to form an image of the object in a single-dimension formation on an image screen. The deflecting step deflects the light of the object transferred by the transferring step in a direction orthogonal to the first direction and to the axis of the light. The scanning step scans the light deflected by the deflecting step.

The plurality of light modulation elements of the light modulation device provided in the providing step may be non-self-light-emitting light modulation elements, and the light modulation mechanism may further include a lighting mechanism for lighting said at least one light modulation device and for selectively transferring light corresponding to a selected signal among the light from the lighting mechanism.

BRIEF DESCRIPTION OF THE DRAWINGS

A more complete appreciation of the disclosure and many of the attendant advantages thereof will be readily obtained as the same becomes better understood by reference to the following detailed description, when considered in connection with the accompanying drawings, wherein.

DETAILED DESCRIPTION OF PREFERRED EMBODIMENTS

Figure 1A:
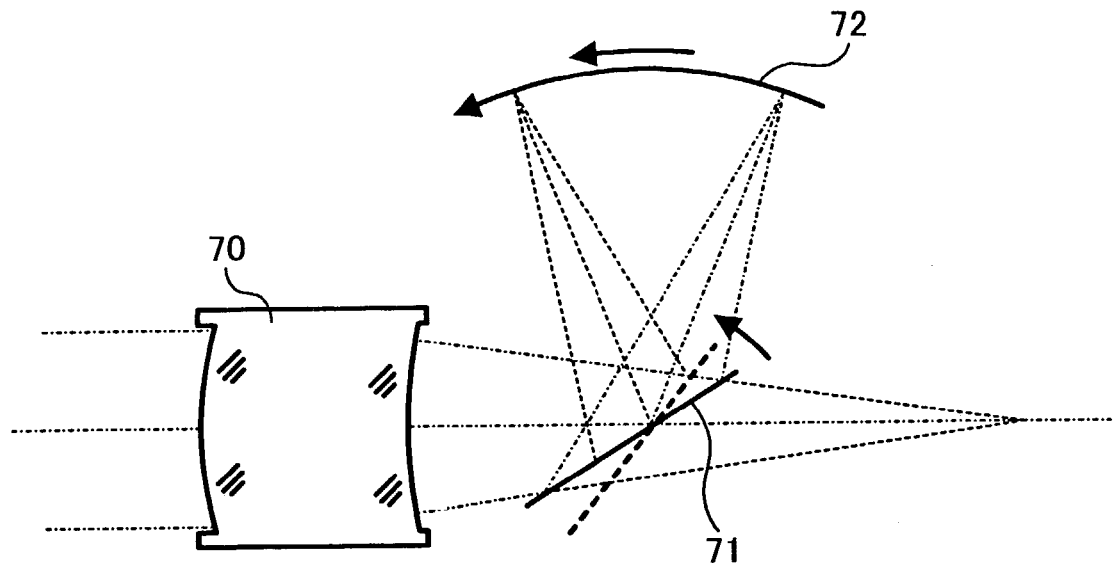
FIGS. 1A and 1B are illustrations for explaining background beam-scanning optical systems.
Figure 1B:
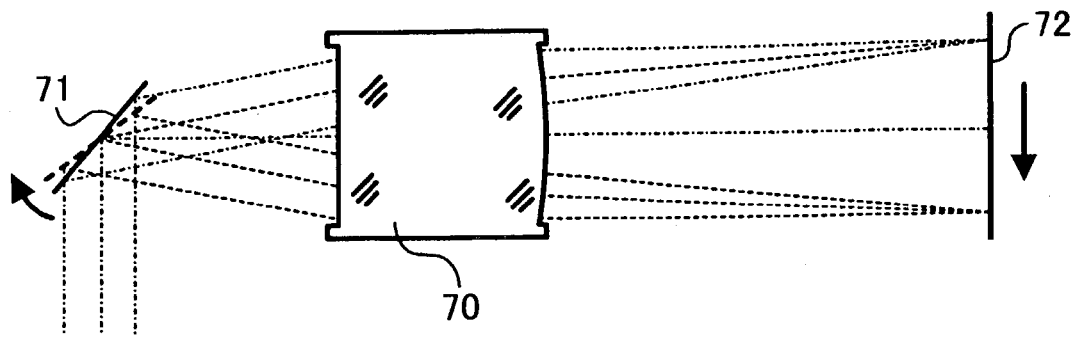

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner. Referring now to the drawings, wherein like reference numerals designate identical or corresponding parts throughout the several views, and particularly to FIG. 2, an optical scanning apparatus 1 according to a preferred embodiment of the present invention is explained. The optical scanning apparatus 1 shown in FIG. 2 includes a light modulation device 10, a light imaging system 20, an aperture element 30, a light deflecting mechanism 40, a light scanning system 50, and an image screen 60. In this order, these components are disposed along a passage of light. The light modulation device 10 includes a self-light-emitting light modulation device in which RGB light modulation elements (not shown) are arranged in a single dimension formation for emitting red (R), green (G), and blue (B) light, and are parallel to one another in line with an appropriate space between two adjacent elements in a direction corresponding to a horizontal direction of the image screen 60. The RGB light modulation elements emit light in directions orthogonal to the direction in which the RGB light modulation elements are disposed. Each of the RGB light modulation elements has a plurality of light emission points arranged in a single-dimension formation in a direction orthogonal to the directions of the arrangement of the RGB light modulation elements and the light axis. This direction orthogonal to the directions of the arrangement of the RGB light modulation elements and the light axis is hereinafter referred to as a first light modulation device (LMD) arrangement direction.

The light imaging system 20 includes lenses 21 and 22. The lens 21 has a positive power and is disposed next to the light modulation device 10. The lens 21 is configured to provide the entire light imaging system 20 with an object space approximate-telecentricity, in which an object space is a space of the light imaging device 10. The lenses 21 and 22 form in collaboration with each other an image of an object on the image screen 60, in which the object is the RGB light modulation elements of the light modulation device 10. The light imaging system 20 substantially satisfies a relationship $Hv \propto fv*\tan(\theta v)$, wherein Hv is an image height of the light imaging system 20 in the first LMD arrangement direction, fv is a focal length of the light imaging system 20 in the first LMD arrangement direction, and $\theta v$ is an incident angle of light entering the light imaging system 20. Under such conditions, the light imaging system 20 can correct an image surface distortion in the first LMD arrangement direction, an aberration of a wave surface with respect to each image height, and a chromatic aberration. Thereby, an image of the object can be formed with less torsion in the first LMD arrangement direction.

The aperture element 30 is disposed at a position behind the light imaging system 20, forming an aperture-behind configuration. The light imaging system 20 is configured to make the effective light rays converged to a maximum extent at the position of the aperture element 30. The light deflecting mechanism 40 is arranged at a position in close vicinity to the aperture element 30 so that a deflective reflection surface of the light deflecting mechanism 40 can be set to an optimum area. In this embodiment, the light deflecting mechanism 40 includes a galvano mirror. As an alternative to the galvano mirror, the light deflecting mechanism 40 may include a polygon mirror.

The light scanning system 50 is arranged on the passage of the light deflected by the above-mentioned light deflecting mechanism 40. Disposing the light scanning system 50 near the light deflecting mechanism 40 gives an advantage that the light scanning system 50 can be made in a relatively small size. At the same time, however, it gives a difficulty in correcting aberrations including the image surface distortion. The distance between the light deflecting mechanism 40 and the light scanning system 50 is determined. in consideration of the balance between the miniaturization requirements and the requirements for the corrections of the aberrations, including the image surface distortion.

With the above-described structure of the optical scanning apparatus 1, the three RGB lines of the light modulation device 10 reach the image screen 60 to form an image thereon at a predetermined line pitch, and perform the scanning while maintaining the predetermined line pitch.

Figure 3:
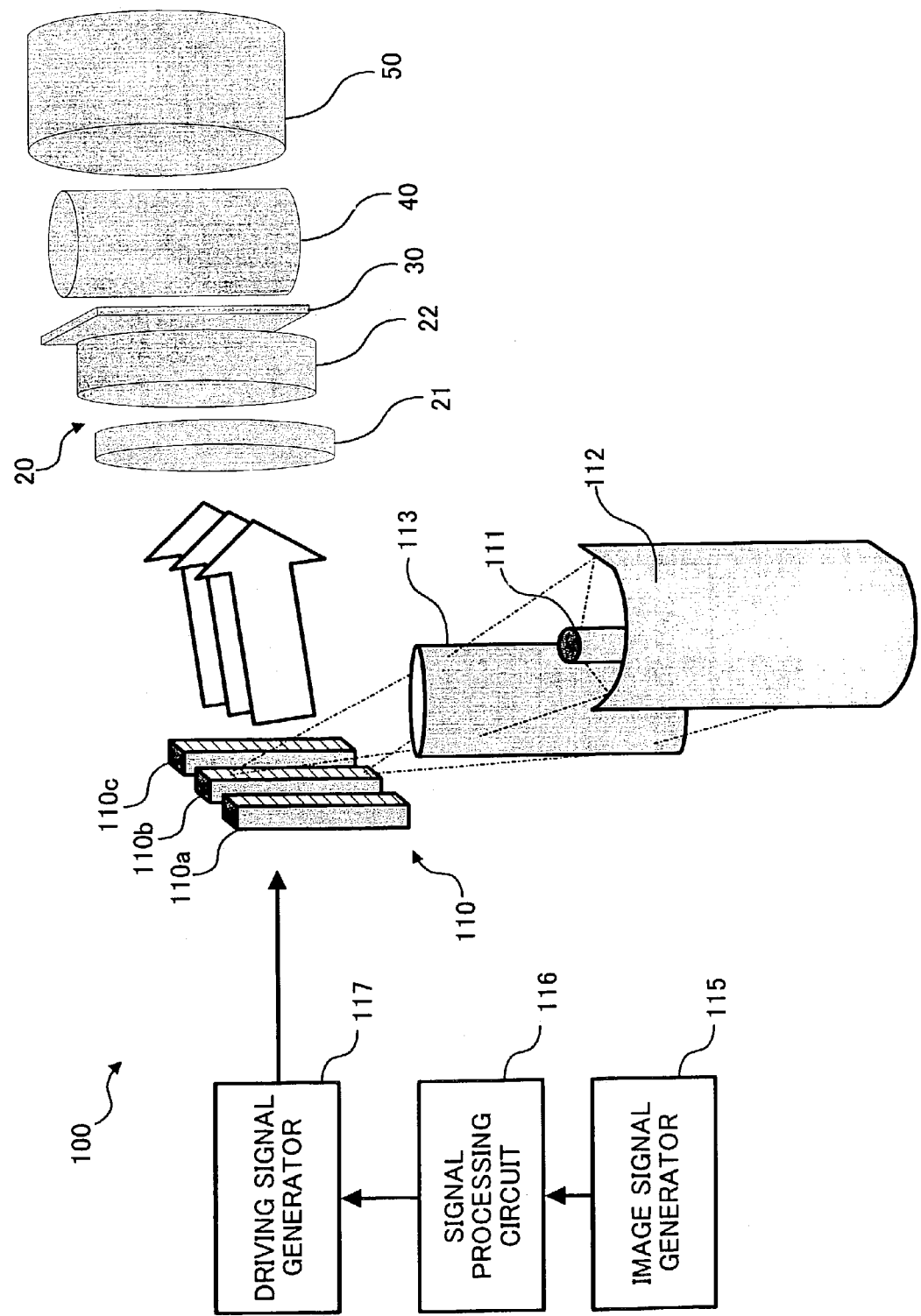
FIG. 3 is an illustration for explaining a display apparatus according to a preferred embodiment of the present invention.

FIG. 3 shows an exemplary structure of a display apparatus 100 including a light modulation device 110 similar to the above-mentioned light modulation device 10. As shown in FIG. 3, the display apparatus 100 includes a linear state light source 111, a cylindrical light reflection mirror 112, a cylindrical lens 113, and the light modulation device 110. The linear state light source 111 generates light in a linear state and the light is deflected by the cylindrical light reflection mirror 112. The linear state light deflected by the cylindrical light reflection mirror 112 is converged by the cylindrical lens 113 to enter the light modulation device 110. The light modulation device 110 is a non-self-light-emitting light modulation device and includes light valve arrays 110a, 110b, and 110c, each including a plurality of optical switching elements. The light valve arrays 110a-110c correspond to R, G, and B lines, respectively, and are arranged at a predetermined space in a direction corresponding to a horizontal direction of a screen (not shown). Each optical switching element included in each of the light valve arrays 110a-110c corresponds to one pixel of light data. The light valve arrays 110a-110c are each referred to as a both-end-fixed beam light valve (BBLV) array, based on their structure as explained below.

Further, in FIG. 3, reference numeral 115 denotes an image signal generator, reference numeral 116 denotes a signal processing circuit, and reference numeral 117 denotes a driving signal generator. These components will be explained in detail below.

Figure 4A:
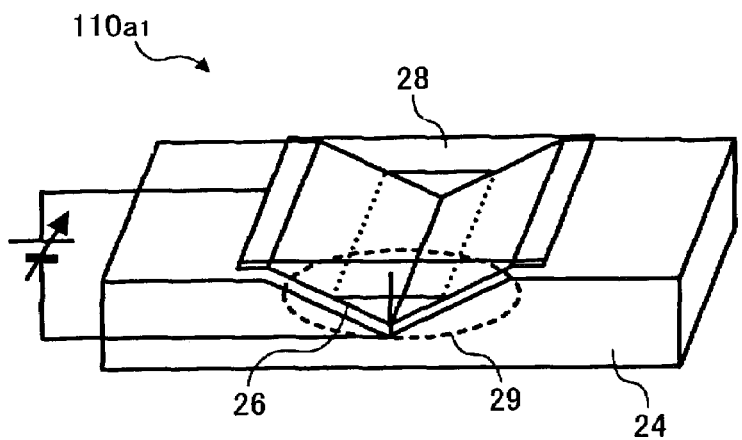
FIGS. 4A-4C are illustrations for explaining the structure and operations of an exemplary light valve used in the light modulation device of the optical scanning apparatus of FIG. 2 and the display apparatus of FIG. 3.
Figure 4B:
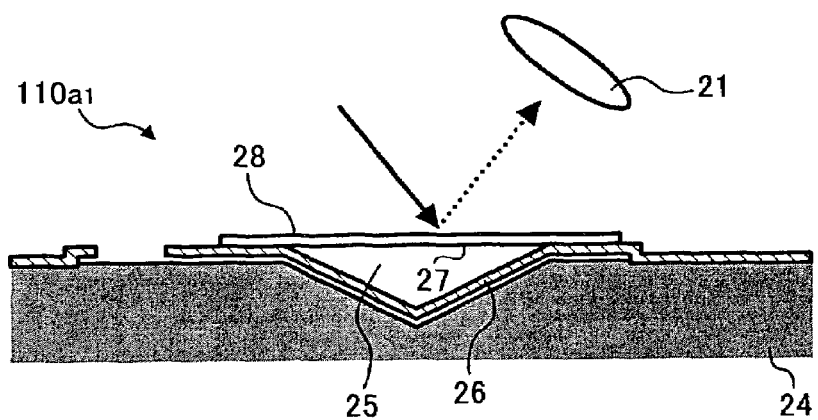
Figure 4C:
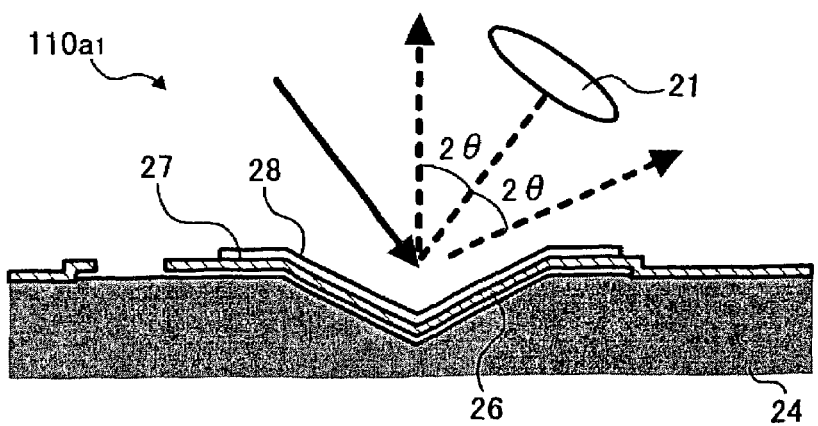

FIGS. 4A-4C show one exemplary optical switching element $110a_1$ of the light valve array 110a, for example, corresponding to one pixel of optical data. The light valve array 110a includes a plurality of optical switching elements, including the optical switching element $110a_1$, which are arranged in the first LMD arrangement direction, as described above with respect to the light modulation device 10 of FIG. 2. As shown in FIG. 4A, the optical switching element $110a_1$ includes a single-crystal silicon substrate 24, which is provided with a V-like-shaped hollow 25 (see FIG. 4B). The surface of the V-like-shaped hollow 25 is covered with a substrate electrode 26. The light valve array 110a further includes a straddle-mount beam 27, which is mounted to the substrate electrode 26 on the horizontal edges of the substrate 24 to overstride the V-like-shaped hollow 25. The surface of the substrate electrode 26 is protected with an appropriate protection film. The straddle-mount beam 27 includes a thin film of a single-crystal silicon, for example. The optical switching element $110a_1$ further includes a light reflection film 28 formed on the straddle-mount beam 27. The light reflection film 28 reflects the incident light in a regular direction. The straddle-mount beam 27 includes an electrode in an edge portion thereof. In this structure, the substrate electrode 26, the straddle-mount beam 27, and the electrode formed in the edge of the straddle-mount beam 27 form an electrostatic actuator 29 with the application of a voltage between the substrate electrode 26 and the electrode formed in the edge of the straddle-mount beam 27.

As shown in FIG. 4B, the lens 21 of the light imaging system 20 is arrange at a position to receive the light reflected in the regular direction by the light reflection film 28.

FIG. 4B shows a condition in which the electrostatic actuator 29 is not applied with voltage. Under the condition of FIG. 4B, the straddle-mount beam 27 and the light reflection film 28 are kept in a plane state. As shown in FIG. 4B, the incident light enters the light reflection film 28 and is reflected towards the lens 21. In this case, an area behind the lens 21 is lighted by the reflected light. That is, the optical switching element 110$a_1$ is turned on.

On the contrary, when the electrostatic actuator 29 is applied with the voltage, an electrostatic force is generated between the substrate electrode 26 and the straddle-mount beam 27 and the straddle-mount beam 27 is attracted to the substrate electrode 26. This causes the light reflection film 28 to bend together with the straddle-mount beam 27, as shown in FIG. 4C. Under this condition, the incident light is scattered and does not reflected towards the lens 21. As a result, the area behind the lens 21 corresponding to this optical switching element 110$a_1$ is not lighted, that is, optical switching element 110$a_1$ is turned off.

The optical switching element 110$a_1$ has a length of 20 μm and a width of 20 μm, for example. The whole light valve array 110$a$ has a length of about 25.2 mm, for example, having 1200 optical switching elements, for example, including the optical switching element 110$a_1$, and is arranged in a single dimension at a pitch of 21 μm, for example. In the light valve array 110$a$, a red color filter member, for example, is made integral with the optical switching elements to emit the R line.

The light valve arrays 110$b$ and 110$c$ are prepared, for example, for the G and B lines, respectively, and are structured in a manner similar to the light valve array 110$a$. The light valve 110 includes the thus-structured single-dimension light valve arrays 110$a$-110$c$, which are arranged parallel to one another at a pitch of about 50 μm, for example, to emit the RGB lines which are modulated.

In FIG. 3, the linear light source 111 includes a halogen lamp, for example, and generates the linear light having a length slightly longer than a length of the light valve array in a direction in which the optical switching elements are arranged. The cylindrical light reflection mirror 112 has a cross section shape of any one of, for example, a circle, an ellipse, a parabola, and an aspheric form expressed by a polynomial expression including higher-degree terms. The cylindrical light reflection mirror 112 and the cylindrical lens 113 converge light rays in a linear form on the surface of the optical switching elements of the light valve 110. An area exposed to the three RGB lines of the light valve 110 has a width of about 0.12 mm, for example. However, the light is actually converged in a width slightly greater than 0.12 mm, and the remaining portion of the light is used for a compensation of a machining tolerance, a positioning error, and so forth associated with the components involved.

Figure 2:
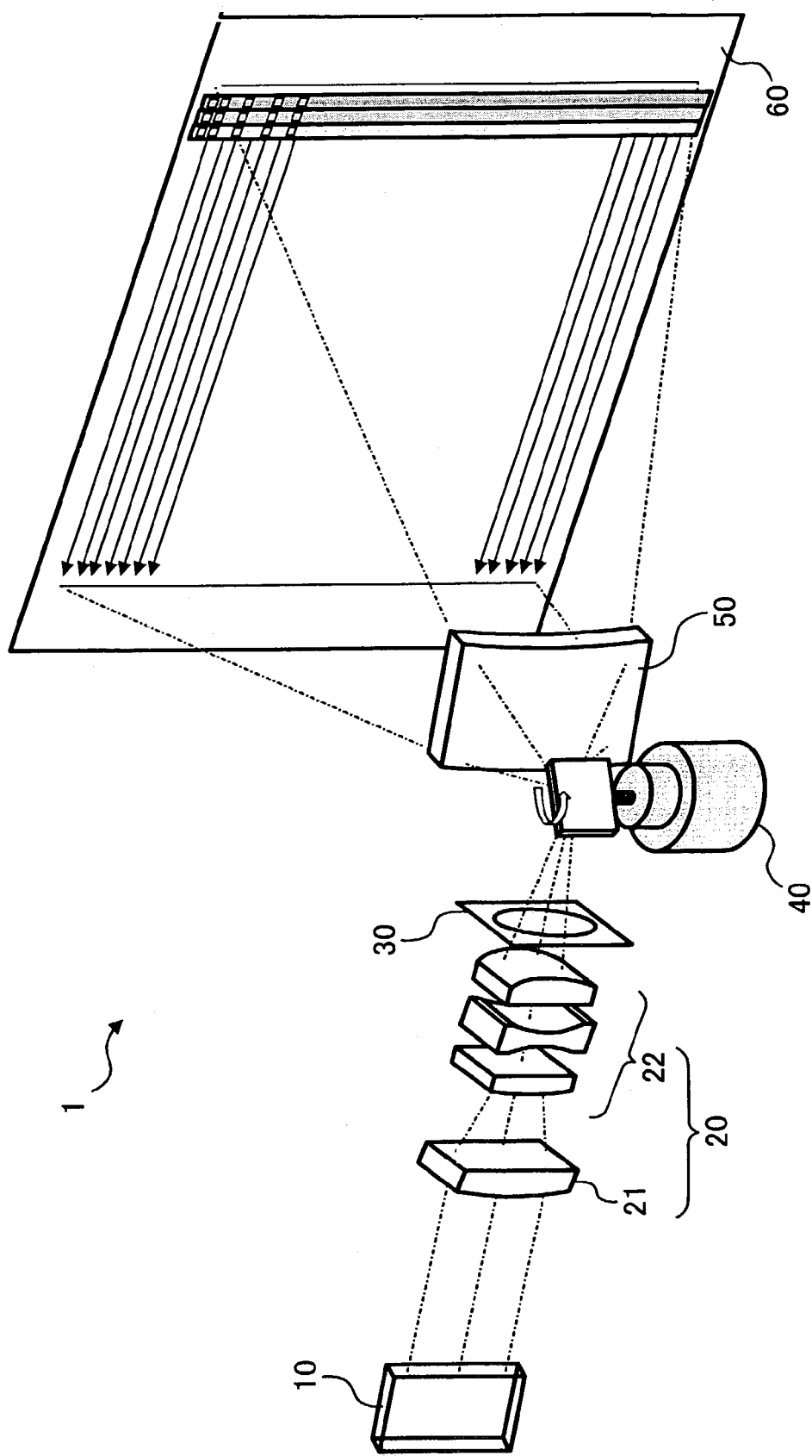
FIG. 2 is an illustration for explaining an optical scanning apparatus according to a preferred embodiment of the present invention.

As shown in FIG. 3, the light imaging system 20, the aperture element 30, the light deflecting mechanism 40, and the light scanning system 50 are arranged on the passage of light reflected by the light modulation device 110 in a manner similar to the case shown in FIG. 2. The light imaging system 20 is set to have a projection length of 2000 mm and a focused image length of 900 mm, for example. The light imaging system 20 has a short side corresponding to the length sides of the light valve arrays 110$a$-110$c$, and has a projection magnification m of −35.7. Thus, the light imaging system 20 having a focal length f of 54.5 mm is optimized under the above-mentioned conditions. The light deflecting mechanism 40 has the deflective reflection surface rotated by an angle between −8.5° and +8.5° to deflect the reflected light by an angle between −17° and +17°. Therefore, an area of 1200 mm, for example, can be scanned and, as a result, 1600 pixels are displayed. The display size is set to 720 mm×540 mm at a display distance of 1200 mm, and to 4000 mm×3000 mm at a display sizes, the light imaging system 20 is moved together with the aperture 30 in a single piece in the light axis direction. An amount of this movement is the order of 1.02 mm at a display distance of 1200 mm in the direction towards the light deflecting mechanism 40, and the order of 1.07 mm at a display distance of 6500 mm in the direction towards the light modulation device 110.

In this display apparatus 100, one pixel is displayed for a display time of 500 ns, for example, when the light deflecting mechanism 40 has an effective mirror-scan-period rate of 50% and a frame frequency is 60 Hz. The display apparatus 100 can express halftone by selecting an on-time period in steps of 5 ns with respect to the display time of 500 ns for one pixel. Further, the display apparatus 100 is capable of expressing the halftone in 100 levels of gray and one million colors with the RGB lines.

In the display apparatus 100 of FIG. 3, the image signal generator 115 generates an image signal to be displayed. The image signal may be a motion picture signal or a still image signal. Also, the image signal may be a signal stored in a memory or a playback signal of a camera, for example. The image signal is processed by the signal processing circuit 116 to become suitable for display. The driving signal generator 117 selectively generates a driving signal in response to the image signal to drive the light modulation device 110.

In the above-described display apparatus 100, the light modulation device 110 selectively reflects light in the regular direction in response to the driving signal selectively generated by the driving signal generator 117 to selectively transmit the light to the light imaging system 20.

In addition, specifications of a color temperature and a lightness may suitably be changed by a selection of the linear light source 111. Also, an increase of temperature in a region after the light modulation device 110 can be suppressed by insertion of various filters such as a filter for cutting infrared light, for example, between the linear light source 111 and the light modulation device 110.

As described above, each of the optical switching elements of the BBLV array has the structure in which a beam is mounted to straddle the V-like-shaped hollow 25 having a width of a few tens of microns, keeping the beam flat to cause a regular reflection of light when the voltage is off, and bending the beam to contact the V-like-shaped hollow 25 to change the light reflection direction when the voltage is on. Accordingly, the BBLV array is arranged such that the optical switching elements thereof selectively transmit the light to the following light imaging system 20 in response to the driving signal from the driving signal generator. Thus, it becomes possible to make a high-switching-frequency and compact optical modulation device capable of forming a superior quality image with an excellent halftone reproducibility. Further, it is possible to provide an optical scanning apparatus and a display apparatus using the features of the BBLD having a rectangular mirror and capable of forming an image with excellent sharpness. Further, the BBLV array is capable of effectively conducting the necessary light by the arrangement of the BBLV array to perform the regular light reflection in accordance with the driving signal selectively generated, as described above.

As one example, it is also possible to use the light modulation device 10 of FIG. 2 in the display apparatus 100, in place of the light modulation device 110. That is, the self-light-emitting light modulation elements generating light by themselves can be used, instead of the BBLV arrays, which are the non-self-light-emitting devices. With using the self-light-emitting light modulation device 10, the extra lighting system, including the light source 111 and the associated components, can be eliminated and the size of the whole system can be reduced. As examples of the self-light-emitting light modulation devices, an LCD (liquid crystal display), an LED (light-emitting diode) array, an LD (laser diode) array, an EL (electroluminescent) array, and so forth can be used. These exemplary devices have inherent characteristics and can selectively be used in accordance with the requirements, such as a low cost apparatus, a small sized apparatus by a miniaturized arrangement of the devices, a high-lightness optical scanning apparatus, and so forth.

In the display apparatus 100 using the self-light-emitting light modulation device 10, the light imaging system 20 preferably satisfies a relationship $Hv \propto fv*\tan(\theta v)$ with respect to a light imaging in the first LMD arrangement direction, wherein Hv is an image height of the light imaging system 20 in the first LMD arrangement direction, fv is a focal length of the light imaging system 20 in the first LMD arrangement direction, and $\theta v$ is an incident angle of light entering the light imaging system 20. Under such conditions, there is no distortion between an object, which is the light modulation device 10, and its image formed by the light imaging system 20. For example, when the object emits a plurality of light rays at an equal pitch, the light imaging system 20 forms an image at an equal pitch. Some image input apparatuses including a video camera or a digital camera featuring a zooming function typically have a distortion aberration (i.e., a linearity) of the order of from 3% to 5%. The distortion aberration is preferably smaller than that value. In a case of an image signal representing data of a text or a data table, input data is generated under the conditions of almost no distortion aberration and, therefore, it is more preferable that the distortion aberration is less that 1%.

The light modulation device 10 is adjusted such that each light modulation element emits the light having the directivity center directing to an incident pupil of the light imaging system 20. That is, the light modulation elements are arranged to emit the light inclining to the light axis with distance from the light axis.

This arrangement can be achieved by gradually inclining the substrate of the light modulation device 10, in the case of the self-light-emitting light modulation device. In the case of the non-self-light-emitting light modulation device, such as the BBLV array, the same effect can be obtained by tilting the regular light reflection surface of the BBLV array. Thus, the difference in lightness of the image can be reduced between the center and the regions other than the center, and images with less variations can be obtained.

A telecentric lens may be used for the lens 21 of the light imaging system 20 closer to the object, as another way to direct the directivity center of the light emitted from the light modulation device 10 towards the incident pupil of the light imaging system 20. This will produce an almost similar effect, as described above. In this case, a general optical device that emits light having the directivity center parallel to the light axis can be used.

With the arrangement in which the directivity center of the light emitted from the light modulation device 10 is directed towards the incident pupil of the light imaging system 20, the light imaging system 20 can have the aperture-behind structure in which the aperture element 30 is disposed at a rear end of the light imaging system 20. With the aperture-behind structure, the light deflecting mechanism 40 and the light scanning system 50 can be arranged at positions in the close vicinity to the light imaging system 20. As a result, the sizes of the light deflecting mechanism 40 and the light scanning system 50 in the first LMD arrangement direction of the light modulation device 10 can be reduced. This leads to a downsize of the display apparatus 100. In addition, the load of a motor for driving the light deflecting mechanism 40 can also be reduced so that the electric power consumption, the heat radiation, and the noise generation can be reduced. In this case, the light deflecting mechanism 40 may include a polygon mirror in place of the galvano mirror.

As an alternative to the aperture-behind structure, the light imaging system 20 can have an inner-aperture structure in which the aperture 30 is disposed inside the light imaging system 20. With the inner-aperture structure, the display apparatus 100 will have a superior feature in an easy aberration correction of the light imaging system 20, although the apparatus may have a relatively large size.

In the optical scanning apparatus 1 shown in FIG. 2, the aberrations relating to the light imaging system 20 are corrected to a minimum. However, two major aberrations generated in the light deflecting mechanism 40, which are the image surface distortion and the linearity, cannot be corrected. The light imaging system 20 is first needed to reduce the image surface distortion. The light scanning system 50 has a large size in comparison with the light imaging system 20 and therefore, the light scanning system 50 is required to reduce the number of optical components thereof. Under these circumstances, an electrical correction may be performed, without correcting the linearity, to change the pixel frequency to a relatively high frequency, for example, when the peripheral regions are scanned. With this correction, the optical scanning apparatus 1 can achieve an even and high performance.

As an alternative, it is also possible to perform the linearity correction in the light scanning system 50 without performing the electrical correction.

In the optical scanning apparatus 1 of FIG. 2, the light scanning system 50 preferably satisfies a relationship $Hh \propto \theta h$ with respect to the performance in the first LMD arrangement direction, wherein Hh is an image height of the light scanning system 50 in the direction orthogonal to the first LMD arrangement direction, and $\theta h$ is an incident angle of light entering the light scanning system 50 after being deflected by the light deflection mechanism 40. As described above, an amount of variation from the linearity is preferably in a range of from 3% to 5% or smaller, and is more preferably smaller than 1%.

The image focusing is carried out by changing the space between the light modulation device 10 and the light imaging system 20 along the light axis. When the light imaging system 20 is telecentric, it is preferable to form the image in a focus without disturbing the telecentric feature. One way is to move the light modulation device 10 as a whole along the light axis of the light imaging system 20. The light imaging system 20 may alternatively be moved along the light axis thereof. At this time, the aperture element 30 may also be moved together with the light imaging system 20 in a single piece.

The optical scanning apparatus 1 of FIG. 2 can also be used as a display apparatus. In this display apparatus, an image formed in a single dimension in a manner corresponding to a specific deflection angle by the light modulation device 10 displays a line image in the vertical direction on the image screen 60. By swinging the light with the light deflecting mechanism 40 in a direction orthogonal to the first LMD arrangement direction by a predetermined angle, this line image is moved in the direction orthogonal to the first LMD arrangement direction so that a full screen image is displayed on the screen 60.

In this display apparatus, the light modulation device includes the plurality of light modulation elements arranged in the single dimension and has various advantages in comparison with an LCD (liquid crystal display) projector, a DMD (digital micro-mirror device) projector, and so on, which forms an image by projecting the light with an area-type light modulation device. For example, the various advantages include a manufacturing cost, ease of manufacturing, a size of the light imaging system, specifically in thickness, and a size of the total apparatus, for example. In particular, an image height of the object and the field angle in the light imaging system are made small by the arrangement of the optical components such that an image of the single-dimension-arranged light modulation device displays the vertical line image of the image screen. Consequently, the display apparatus is made in a relatively small size and can easily obtain a superior image quality.

It is also possible to configure the display apparatus in which an image formed in a single dimension in a manner corresponding to a specific deflection angle by the light modulation device 10 displays a line image in the horizontal direction on the image screen 60. The light is swung with the light deflecting mechanism 40 in a direction orthogonal to the first LMD arrangement direction by a predetermined angle, so that this line image is moved in the direction orthogonal to the first LMD arrangement direction, thereby displaying a full screen image on the image screen 60. With this configuration, the display apparatus has advantages in which the light scanning system can be made relatively small and the pixel frequency can be relatively low. This display apparatus, however, needs to read the image signal into a frame memory or the like and to change arrangement of the signal from time to time in the signal processing circuit 116, for example, to drive the light modulation device.

In the above-described embodiments, the light modulation devices are driven by pulse width modulation (PWM) signals having binary values of "on" and "off," wherein the "on" time period is shorter than a time period of displaying one pixel. Thus, intermediate values of light intensity can be displayed. This arrangement can be applied to the light modulation device, which cannot change in principle the display time of one pixel. In addition, with this arrangement, the light modulation device, which normally generates a flare with an intermediate light intensity due to the operational principle thereof, can avoid generating a flare.

As described above, the RGB light modulation elements are arranged in the first LMD arrangement direction in the light modulation device of the optical scanning apparatus 1 of FIG. 2. As one example, it is possible to provide a color display apparatus by changing the arrangement of the RGB light modulation elements in the light modulation device of the optical scanning apparatus 1 of FIG. 2. That is, the RGB light modulation elements are arranged in a direction orthogonal to the first LMD arrangement direction. With this structure, the pitch of the arrangement of the RGB light modulation elements can be determined in an arbitrary manner to facilitate the manufacturing of the display apparatus in comparison with a display apparatus using an area-type light modulation device.

The light modulation device can be provided with an on-chip color filter or a color filter member joined thereto such that the compactness of the light modulation device is not disturbed. With this structure, the RGB light modulation elements can commonly use a single lighting system. In addition, multiple colors can be reproduced in combinations of the above-described various structures.

In the above-mentioned display apparatus using the light modulation device in which the RGB light modulation elements are arranged in the orthogonal direction relative to the first LMD arrangement direction, it may be possible to synthesize the color by overlaying the RGB colors at different times at a position where the same pixel is formed in the scanning direction. With this arrangement, the display apparatus can use a common light imaging system, a common light deflecting mechanism, and a common light scanning system with respect to the RGB colors.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2002-007204, filed on Jan. 16, 2002, in the Japanese Patent Office, the entire contents of which are incorporated by reference herein.

What is claimed is:

1. An optical scanning apparatus, comprising:
   a light modulation mechanism including at least one light modulation device including a plurality of light modulation elements and configured to emit modulated light, the plurality of light modulation elements being arranged in a single-dimension formation in a first direction orthogonal to a light axis of the modulated light;
   a light imaging mechanism configured to receive the modulated light from the light modulation mechanism as light of an object and to transfer the light of the object to form an image of the object in a single-dimension formation on an image screen;
   a light deflecting mechanism configured to deflect the light of the object transferred from the light imaging mechanism in a direction orthogonal to the first direction and to the axis of the light; and
   a light scanning mechanism disposed on a passage of the light deflected by the light deflecting mechanism and configured to scan the light deflected by the light deflecting mechanism,
   wherein the light scanning mechanism includes means for reducing an image surface distortion caused by the light deflecting mechanism.

2. An optical scanning apparatus as defined in claim 1, wherein the plurality of light modulation elements are non-self-light-emitting light modulation elements, and the light modulation mechanism further includes a lighting mechanism for lighting said at least one light modulation device and selectively transferring light corresponding to a selected signal among the light from the lighting mechanism.

3. An optical scanning apparatus as defined in claim 2, wherein each of the plurality of non-self-light-emitting light modulation elements is a both-end-fixed beam light valve including a light reflection film, and is configured to reflect the light from the lighting mechanism such that light reflected in a regular manner corresponds to the selected signal.

4. An optical scanning apparatus as defined in claim 1, wherein each of the plurality of light modulation elements are self-light-emitting light modulation elements.

5. An optical scanning apparatus as defined in claim 1, wherein the light imaging mechanism satisfies a relationship $Hv \propto fv*\tan(\theta v)$, wherein Hv is an image height of the light imaging mechanism in the first direction, fv is a focal length of the light imaging mechanism in the first direction, and $\theta v$ is an incident angle of light entering the light imaging mechanism.

6. An optical scanning apparatus as defined in claim 5, wherein the modulated light from each of the plurality of light modulation elements has a directivity center directed to an incident pupil of the light imaging mechanism.

7. An optical scanning apparatus as defined in claim 5, wherein the light imaging mechanism includes a telecentric optical element arranged at a position facing the object.

8. An optical scanning apparatus as defined in claim 5, wherein the light imaging mechanism has an aperture-behind structure.

9. An optical scanning apparatus as defined in claim 1, wherein the light scanning mechanism satisfies a relationship $Hh \propto \theta h$, wherein Hh is an image height of the light scanning mechanism in a direction orthogonal to the first direction, and $\theta h$ is an incident angle of light entering the light scanning mechanism after the deflection by the light deflecting mechanism.

10. An optical scanning apparatus as defined in claim 1, wherein a distance between the light modulation mechanism and the light imaging mechanism along the light axis is adjusted to focus the modulated light to form an image of the object.

11. A display apparatus, comprising:
an image screen; and
an optical scanning apparatus, comprising:
  a light modulation mechanism including at least one light modulation device including a plurality of light modulation elements and configured to emit modulate light, the plurality of light modulation elements being arranged in a single-dimension formation in a first direction orthogonal to a light axis of the modulated light;
  a light imaging mechanism configured to receive the modulated light from the light modulation mechanism as light of an object and to transfer the light of the object to form an image of the object in a single-dimension formation on an image screen;
  a light deflecting mechanism configured to deflect the light of the object transferred from the light imaging mechanism in a direction orthogonal to the first direction and to the light axis; and
  a light scanning mechanism disposed on a passage of the light deflected by the light deflecting mechanism and configured to scan the light deflected by the light deflecting mechanism,
wherein an image of the object formed in the single dimension in a manner corresponding to a specific deflection angle displays a line image in a vertical direction on the image screen and, by swinging the light from the light imaging mechanism with the light deflecting mechanism by a predetermined angle in a second direction orthogonal to the first direction, the line image formed in the vertical direction on the image screen is moved in the second direction so that a full screen image is displayed on the image screen.

12. A display apparatus as defined in claim 11, wherein each of the plurality of light modulation elements is switched between on and off statuses, and each has a time period of on status that is shorter than a time period of displaying one pixel, to express an intermediate light intensity.

13. A display apparatus as defined in claim 11, wherein said at least one light modulation device includes three light modulation devices corresponding to red, green, and blue colors arranged in a direction orthogonal to the first direction.

14. A display apparatus as defined in claim 13, wherein color synthesizing is performed by overlaying the red, green, and blue colors at different times at a same pixel position in a scanning direction.

15. A display apparatus, comprising:
an image screen; and
an optical scanning apparatus, comprising:
  a light modulation mechanism including at least one light modulation device including a plurality of light modulation elements and configured to modulate light and to emit the modulated light, the plurality of light modulation elements being arranged in a single-dimension formation in a first direction orthogonal to a light axis of the modulated light;
  a light imaging mechanism configured to receive the modulated light from the light modulation mechanism as light of an object and to transfer the light of the object to form an image of the object in a single-dimension formation on an image screen;
  a light deflecting mechanism configured to deflect the light of the object transferred from the light imaging mechanism in a direction orthogonal to the first direction and to the light axis; and
  a light scanning mechanism disposed on a passage of the light deflected by the light deflecting mechanism and configured to scan the light deflected by the light deflecting mechanism,
wherein an image of the object formed in the single dimension in a manner corresponding to a specific deflection angle displays a line image in a horizontal direction on the image screen and, by swinging the light from the light imaging mechanism with the light deflecting mechanism by a predetermined angle in a second direction orthogonal to the first direction, the line image formed in the horizontal direction on the image screen is moved in the second direction so that a full screen image is displayed on the image screen.

16. A display apparatus as defined in claim 15, wherein each of the plurality of light modulation elements is switched between on and off statuses, and each has a time period of on status that is shorter than a time period of displaying one pixel, to express an intermediate light intensity.

17. A display apparatus as defined in claim 15, wherein said at least one light modulation device includes three light modulation devices corresponding to red, green, and blue colors arranged in a direction orthogonal to the first direction.

18. A display apparatus as defined in claim 17, wherein color synthesizing is performed by overlaying the red, green, and blue colors at different times at a same pixel position in a scanning direction.

19. An optical scanning apparatus, comprising:
light modulating means for modulating and emitting light extended in a single-dimension formation in a first direction orthogonal to an axis of the light;
light imaging means for receiving the light modulated and emitted by the light modulating means as light of an object and transferring the light of the object to form an image of the object in the single-dimension formation on an image screen;
light deflecting means for deflecting the light of the object transferred by the light imaging means in a direction orthogonal to the first direction and to the axis of the light; and
light scanning means for scanning the light deflected by the light deflecting means,
wherein the light scanning means includes a means for reducing an image surface distortion caused by the light deflecting means.

20. An optical scanning apparatus as defined in claim 19, wherein the light modulating means includes at least one light modulation device including a plurality of light modulation elements arranged in the single-dimension formation in the first direction.

21. An optical scanning apparatus as defined in claim 20, wherein the plurality of light modulation elements are non-self-light-emitting light modulation elements, and the light modulating means further includes lighting means for lighting said at least one light modulation device and for selectively transferring light corresponding to a selected signal among the light from the lighting means.

22. An optical scanning apparatus as defined in claim 20, wherein each of the plurality of non-self-light-emitting light modulation elements is a both-end-fixed beam light valve including a light reflection film, and is configured to reflect the light from the lighting means such that light reflected in a regular manner corresponds to the selected signal.

23. An optical scanning apparatus as defined in claim 20, wherein each of the plurality of light modulation elements are self-light-emitting light modulation elements.

24. An optical scanning apparatus as defined in claim 20, wherein the modulated light from each of the plurality of light modulation elements has a directivity center directed to an incident pupil of the light imaging means.

25. An optical scanning apparatus as defined in claim 19, wherein the light imaging means satisfies a relationship $Hv \propto fv*\tan(\theta v)$, wherein Hv is an image height of the light imaging means in the first direction, fv is a focal length of the light imaging means in the first direction, and $\theta v$ is an incident angle of light entering the light imaging means.

26. An optical scanning apparatus as defined in claim 19, wherein the light imaging means includes a telecentric optical element arranged at a position facing the object.

27. An optical scanning apparatus as defined in claim 19, wherein the light imaging means has an aperture-behind structure.

28. An optical scanning apparatus as defined in claim 19, wherein the light scanning means satisfies a relationship $Hh \propto \theta h$, wherein Hh is an image height of the light scanning means in a direction orthogonal to the first direction, and $\theta h$ is an incident angle of light entering the light scanning means after the deflection by the light deflecting means.

29. An optical scanning apparatus as defined in claim 19, wherein a distance between the light modulating means and the light imaging means along the light axis is adjusted to focus the modulated light to form an image of the object.

30. A display apparatus, comprising:
image screen means for receiving light; and
an optical scanning apparatus, comprising:
light modulating means for modulating and emitting light extended in a single-dimension formation in a first direction orthogonal to an axis of the light;
light imaging means for receiving the light modulated and emitted by the light modulating means as light of an object and transferring the light of the object to form an image of the object in a single-dimension formation on an image screen;
light deflecting means for deflecting the light of the object transferred by the light imaging means in a direction orthogonal to the first direction and to the axis of the light; and
light scanning means for scanning the light deflected by the light deflecting means,
wherein an image of the object formed in the single dimension in a manner corresponding to a specific deflection angle displays a line image in a vertical direction on the image screen and, by swinging the light from the light imaging means with the light deflecting means by a predetermined angle in a second direction orthogonal to the first direction and the light axis, the line image formed in the vertical direction on the image screen is moved in the second direction so that a full screen image is displayed on the image screen.

31. A display apparatus as defined in claim 30, wherein the light modulating means includes at least one light modulation device including a plurality of light modulation elements arranged in a single-dimension formation in the first direction.

32. A display apparatus as defined in claim 30, wherein each of the plurality of light modulation elements is switched between on and off statuses, and each has a time period of on status that is shorter than a time period of displaying one pixel, to express an intermediate light intensity.

33. A display apparatus as defined in claim 30, wherein said at least one light modulation device includes three light modulation devices corresponding to red, green, and blue colors arranged in a direction orthogonal to the first direction.

34. A display apparatus as defined in claim 33, wherein color synthesizing is performed by overlaying the red, green, and blue colors at different times at a same pixel position in a scanning direction.

35. A display apparatus, comprising:
image screen means for receiving light; and
an optical scanning apparatus, comprising:
light modulating means for modulating and emitting light extended in a single-dimension formation in a first direction orthogonal to an axis of the light;
light imaging means for receiving the light modulated and emitted by the light modulating means as light of an object and transferring the light of the object to form an image of the object in a single-dimension formation on an image screen;

light deflecting means for deflecting the light of the object transferred by the light imaging means in a direction orthogonal to the first direction and to the axis of the light; and light scanning means for scanning the light deflected by the light deflecting means, wherein an image of the object formed in the single dimension in a manner corresponding to a specific deflection angle displays a line image in a horizontal direction on the image screen and, by swinging the light from the light imaging means with the light deflecting means by a predetermined angle in a second direction orthogonal to the first direction and the light axis, the line image formed in the vertical direction on the image screen is moved in the second direction so that a full screen image is displayed on the image screen.

36. A display apparatus as defined in claim 35, wherein the light modulating means includes at least one light modulation device including a plurality of light modulation elements arranged in a single-dimension formation in the first direction.

37. A display apparatus as defined in claim 35, wherein each of the plurality of light modulation elements is switched between on and off statuses, and each has a time period of on status that is shorter than a time period of displaying one pixel, to express an intermediate light intensity.

38. A display apparatus as defined in claim 35, wherein said at least one light modulation device includes three light modulation devices corresponding to red, green, and blue colors arranged in a direction orthogonal to the first direction.

39. A display apparatus as defined in claim 38, wherein color synthesizing is performed by overlaying the red, green, and blue colors at different times at a same pixel position in a scanning direction.

40. An optical scanning method, comprising the steps of:
providing a light modulation mechanism including at least one light modulation device including a plurality of light modulation elements arranged in a single-dimension formation in the first direction;

driving the light modulation mechanism to emit modulated light extended in the single-dimension formation in a first direction orthogonal to an axis of the light;

transferring the modulated light as light of an object to form an image of the object in a single-dimension formation on an image screen;

deflecting the light of the object transferred by the transferring step in a direction orthogonal to the first direction and to the axis of the light; and scanning the light deflected by the deflecting steps, wherein the scanning step has a function of reducing an image surface distortion caused by the deflecting step.

41. A optical scanning method as defined in claim 40, wherein the plurality of light modulation elements are non-self-light-emitting light modulation elements, and the light modulation mechanism further includes a lighting mechanism for lighting said at least one light modulation device and for selectively transferring light corresponding to a selected signal among the light from the lighting mechanism.

42. A optical scanning method as defined in claim 40, wherein each of the plurality of non-self-light-emitting light modulation elements is a both-end-fixed beam light valve including a light reflection film, and is configured to reflect the light from the lighting mechanism such that light reflected in a regular manner corresponds to the selected signal.

43. A optical scanning method as defined in claim 40, wherein each of the plurality of light modulation elements are self-light-emitting light modulation elements.

44. A optical scanning method as defined in claim 40, wherein the transferring step satisfies a relationship $Hv \propto fv*\tan(\theta v)$, wherein $Hv$ is an image height in the first direction in the transferring step, $fv$ is a focal length in the transferring step in the first direction, and $\theta v$ is an incident angle of light in the transferring step.

45. A optical scanning method as defined in claim 40, wherein the modulated light from each of the plurality of light modulation elements has a directivity center directed to an incident pupil in the transferring step.

46. A optical scanning method as defined in claim 40, wherein the transferring step uses a telecentric optical element arranged at a position facing the object.

47. A optical scanning method as defined in claim 40, wherein the transferring step uses an aperture-behind structure.

48. A optical scanning method as defined in claim 40, wherein the scanning step satisfies a relationship $Hh \propto \theta h$, wherein $Hh$ is an image height in a direction orthogonal to the first direction in the scanning step, and $\theta h$ is an incident angle of light in the scanning step after the deflecting step.

* * * * *